(12) United States Patent
Hoffmann et al.

(10) Patent No.: US 10,981,125 B2
(45) Date of Patent: Apr. 20, 2021

(54) METHOD FOR COMPOUNDING AND APPLYING ADHESIVES

(71) Applicants: Henkel AG & Co. KGaA, Duesseldorf (DE); Homag Holzbearbeitungssysteme GmbH, Schopfloch (DE)

(72) Inventors: Knut Hoffmann, Duesseldorf (DE); Juergen Lotz, Kiedrich (DE); Johannes Schmid, Wachendorf (DE)

(73) Assignees: Henkel AG & Co. KGaA, Duesseldorf (DE); Homag Holzbearbeitungssysteme GmbH, Schopfloch (DE)

( * ) Notice: Subject to any disclaimer, the term of this patent is extended or adjusted under 35 U.S.C. 154(b) by 0 days.

(21) Appl. No.: 16/002,113

(22) Filed: Jun. 7, 2018

(65) Prior Publication Data
US 2018/0280898 A1 Oct. 4, 2018

Related U.S. Application Data

(63) Continuation of application No. PCT/EP2016/079715, filed on Dec. 5, 2016.

(30) Foreign Application Priority Data

Dec. 11, 2015 (DE) ...................... 10 2015 224 997.2

(51) Int. Cl.
*B01F 3/10* (2006.01)
*B01F 5/06* (2006.01)
(Continued)

(52) U.S. Cl.
CPC .............. *B01F 3/10* (2013.01); *B01F 3/0803* (2013.01); *B01F 3/0853* (2013.01);
(Continued)

(58) Field of Classification Search
None
See application file for complete search history.

(56) References Cited

U.S. PATENT DOCUMENTS

| 9,375,895 B2 | 6/2016 | Paschkowski et al. |
| 2005/0003197 A1 | 1/2005 | Good et al. |

(Continued)

FOREIGN PATENT DOCUMENTS

| CN | 102015951 A | 4/2011 |
| CN | 103958632 A | 7/2014 |

(Continued)

OTHER PUBLICATIONS

Machine Translation of EP 1375008 A2 (Year: 2004).*
(Continued)

*Primary Examiner* — Shamim Ahmed
*Assistant Examiner* — Bradford M Gates
(74) *Attorney, Agent, or Firm* — James E. Piotrowski

(57) ABSTRACT

The invention relates to continuous methods for compounding and applying adhesives, characterized in that (i) a base component of the adhesive is mixed continuously with at least one aggregate so as to produce a compounded adhesive; and (ii) the adhesive compounded in this manner is applied to a substrate. The invention also relates to such methods where a device as described here is used to carry out the method.

18 Claims, 6 Drawing Sheets

(51) Int. Cl.

| | |
|---|---|
| *C09J 175/04* | (2006.01) |
| *B01F 7/00* | (2006.01) |
| *B29B 7/32* | (2006.01) |
| *B29B 7/60* | (2006.01) |
| *B29B 7/94* | (2006.01) |
| *B29B 7/40* | (2006.01) |
| *B01F 3/08* | (2006.01) |
| *B01F 3/12* | (2006.01) |
| *B01F 3/14* | (2006.01) |
| *B05D 1/26* | (2006.01) |
| *B05D 1/28* | (2006.01) |
| *B05D 5/10* | (2006.01) |
| *B05C 1/08* | (2006.01) |
| *B05C 11/10* | (2006.01) |
| *B29B 7/72* | (2006.01) |

(52) U.S. Cl.
CPC .......... *B01F 3/0861* (2013.01); *B01F 3/1214* (2013.01); *B01F 3/1221* (2013.01); *B01F 3/14* (2013.01); *B01F 5/0615* (2013.01); *B01F 7/00391* (2013.01); *B01F 7/00908* (2013.01); *B01F 7/00916* (2013.01); *B05D 1/26* (2013.01); *B05D 1/28* (2013.01); *B05D 5/10* (2013.01); *B29B 7/325* (2013.01); *B29B 7/40* (2013.01); *B29B 7/603* (2013.01); *B29B 7/94* (2013.01); *C09J 175/04* (2013.01); *B01F 2005/0637* (2013.01); *B01F 2215/006* (2013.01); *B01F 2215/0039* (2013.01); *B05C 1/08* (2013.01); *B05C 11/1042* (2013.01); *B29B 7/72* (2013.01)

(56) References Cited

U.S. PATENT DOCUMENTS

| | | | |
|---|---|---|---|
| 2006/0144523 A1* | 7/2006 | Robert | B65H 45/30 |
| | | | 156/443 |
| 2008/0156438 A1 | 7/2008 | Stumphauzer et al. | |
| 2008/0161496 A1* | 7/2008 | Stumphauzer | C09J 123/0853 |
| | | | 525/194 |
| 2010/0291368 A1* | 11/2010 | Burckhardt | C09J 175/04 |
| | | | 428/221 |
| 2013/0115442 A1* | 5/2013 | Sang | C08G 59/4253 |
| | | | 428/327 |
| 2014/0329074 A1 | 11/2014 | Janke et al. | |
| 2017/0120288 A1 | 5/2017 | Schmid et al. | |

FOREIGN PATENT DOCUMENTS

| | | | | |
|---|---|---|---|---|
| DE | 153605 A1 | 1/1982 | | |
| EP | 1375008 A2 * | 1/2004 | .......... | B01F 7/00216 |
| EP | 1743777 A1 | 1/2007 | | |
| EP | 1800738 A1 | 6/2007 | | |
| JP | 2012180525 A | 9/2012 | | |
| WO | 9846694 A1 | 10/1998 | | |
| WO | 2015188991 A1 | 12/2015 | | |

OTHER PUBLICATIONS

Machine Translation of EP 1743777 A1 (Year: 2007).*
International Search Report for International PCT Patent Application No. PCT/EP2016/079715 dated Mar. 15, 2017.
PCT Written Decision of the International Searching Authority for International PCT Patent Application No. PCT/EP2016/079715.

* cited by examiner

METHOD FOR COMPOUNDING AND APPLYING ADHESIVES

The invention relates to continuous methods for compounding and applying adhesives, characterized in that (i) a base component of the adhesive is continuously mixed with at least one additive in order to produce a compounded adhesive; and (ii) the adhesive compounded in this way is applied to a substrate.

Panels having large surface areas are used in the manufacture of furniture or furniture elements, which panels are cut to size and provided with an edge band on the narrow edges thereof. The edge band is bonded to the narrow side of the panel by means of an adhesive. It is evident that the demands placed on the adhesive vary and that different properties should be exhibited depending on the furniture element and/or furniture and/or application and/or field of use.

For example, in furniture or furniture element manufacture, a standardized adhesive is conventionally used that is used in all applications and in all furniture elements. In this case, the adhesive is scarcely visible in some color combinations on account of its color, whereas in other color combinations of the furniture or furniture element the adhesive visibly stands out, to detrimental effect, because the color thereof does not match that of the furniture or furniture element. The use of a correspondingly colored adhesive often fails because the quantities of adhesive that need to be bought from an adhesive producer can only be purchased economically when there is a very high number of pieces to process.

EP 1 743 777 A1 discloses an adhesive application station that allows dyes to be admixed to the adhesive. However, the disclosed adhesive application station is disadvantageous in that the quantities of adhesive that can be produced thereby can only be produced in a discontinuous operation. The mixing in this case takes places after the dye is fed into the adhesive, the mixing additive being removed after the adhesive is mixed and the adhesive being pressed out of an outlet slot by means of the movement of the piston provided inside the housing of the station. When the adhesive produced in this way has been depleted, the station has to be refilled with new adhesive, the mixing additive re-introduced, and a new batch of adhesive produced and mixed. Said station is therefore not suitable for continuous operation on an industrial scale for the production of a large number of pieces of furniture or furniture elements.

It is often also the goal to customize the adhesive to the intended use thereof or with respect to the intended use of the furniture.

The object of the invention is to provide a continuous method for compounding and applying adhesives that allows individualization of adhesives but can nevertheless also be used in the craft sector or is also suitable for industrially processable quantities.

This object is achieved by the methods described herein. In a first aspect, the invention therefore relates to a continuous method for compounding and applying an adhesive composition, characterized in that
(i) a base component of the adhesive is continuously mixed with at least one additive in order to produce a compounded adhesive; and
(ii) the adhesive compounded in this way is applied to a substrate.

"At least one", as used herein, refers to one or more, for example 1, 2, 3, 4, 5, 6, 7, 8, 9 or more. In connection with components of the compositions described herein, this information does not refer to the absolute quantity of molecules, but to the type of the component. "At least one polyol" therefore means, for example, one or more different polyols, which is to say one or more different types of polyols. Together with stated quantities, the stated quantities refer to the total quantity of the correspondingly designated type of component, as defined above.

"Continuously", as used herein in connection with the methods described, means that the methods are continuously operated, i.e. that the mixing and application take place continuously, in particular that the application takes place in a continuous process directly after the mixing/compounding.

All percentages, unless otherwise specified, relate to the % by weight based in each case on the total weight of the corresponding composition.

Since the adhesive is used in particular for finishing the narrow sides of chipboards by means of an edge band, the method can also comprise a further step (iii), specifically the adhesive bonding of the substrate to a second substrate, in order to thus obtain a workpiece. Said second substrate can in this case be an edge band that is adhesively bonded to a chipboard (the first substrate). The adhesive can generally be applied to the surface of the substrate over a partial surface area i.e. limited to specific regions of the substrate. In the preferred embodiments of the invention, the adhesive is applied to the narrow side of a (chip)board, it being possible to also apply the adhesive to the narrow side over a full surface area or only over a partial surface area, it being possible in the latter case to completely wet the surface of the narrow side when it is adhesively bonded to an edge band by means of pressing. The adhesively bonded substrates obtained in this way, i.e. in particular chipboards and edge bands that are produced by means of the methods according to the invention, are also referred to herein as "workpieces".

In various embodiments of the methods, the base component of the adhesive and/or the at least one additive in step (i) are fed in in a controlled manner. This makes it possible to adapt the adhesive, by means of the type and quantity of the additive, to the desired intended use, or to the substrate used, in particular in regard to color, curing speed, adhesive strength etc.

In various embodiments, the base component of the adhesive is a hot-melt adhesive composition. "Base component", as used herein, means the actual binder. In various embodiments, the base component is already a complete adhesive composition that is directly used as such and can already be obtained in this form, for example commercially. In this case, the additive can only further adapt the adhesive composition to the desired intended use, for example for color matching. Alternatively, however, the additive can also contain components that influence the adhesive properties. Appropriate additives are described in detail below.

In various embodiments, the base component of the adhesive is a hot-melt adhesive composition that is solid at room temperature and liquid at an elevated temperature. "Liquid", as used herein, refers to compositions that are flowable at the stated temperature and at normal pressure (1013 mbar). In various embodiments, the hot-melt adhesive compositions have melting temperatures in the range of from 90 to 300° C., in particular in the range of from 120 to 250° C., the melting temperature also being dependent on the adhesive system used.

In various embodiments, single-component reactive adhesive systems can be used, for example. Said systems can be moisture-cross-linking, for example. Reactive adhesives of this kind can be based on polyurethane, for example. Suitable adhesives can be obtained under the trade name Technomelt PUR (Henkel AG & Co. KGaA, DE). Alternatively, however, other types of cross-linking can be used. It is also possible to use two-component adhesives that are then mixed with one another directly before or during step (i).

Alternatively, the adhesive base components used can be non-reactive hot-melt adhesives, i.e. in particular physical, curing, thermoplastic adhesive systems. Systems of this kind are also known in the prior art and are based in particular on polyolefins.

Since hot-melt adhesives are preferably used, the methods are carried out in various embodiments such that the adhesive is compounded and/or applied at an elevated temperature, in particular at a temperature above the melting point of the base component of the adhesive. The appropriate temperature ranges are the ranges already disclosed above in connection with the hot-melt adhesives. In reactive adhesives, temperatures in the range of from 100 to 140° C. are conventionally used, while in non-reactive thermoplastic adhesive systems, temperatures in the range of from 150 to 220° C. are frequently used. However, in general, the temperatures are selected on the basis of the adhesive and the substrate used. In this case, temperatures are selected such that the adhesive is present in a form that is suitable for compounding and applying, while at the same time decomposition of the adhesive, detrimental influences on the substrate and unnecessary energy consumption are minimized.

The at least one additive comprises in particular a substance that influences the chemical properties, the biological properties and/or the physical properties of the adhesive. Chemical properties include, but are not limited to, adhesion and/or curing speed, for example. Biological properties include, but are not limited to, biocidal properties and resistance against mold fungus formation, while physical properties include, for example, viscosity, recrystallization behavior and color.

In various embodiments, the at least one additive comprises a color pigment, an agent for improving moisture resistance or the resistance against mold fungus formation, a biocidal agent, an additive for improved energy absorption, a primer for improved adhesive bonding, an agent for influencing the recrystallization of the adhesive and/or a reaction accelerator, particularly preferably a color pigment and/or an agent for influencing the recrystallization of the adhesive. These active components of the additive can be formulated together with a carrier that is compatible with the adhesive system. For instance, in the case of PU-based adhesives, said carrier can include one or more polyols, for example. In the case of thermoplastic adhesives, in particular those based on polyolefin, the carrier can also be one or more polyolefins. The active ingredient of the additive, in many cases a color pigment or a mixture of color pigments, is then admixed with said carrier.

In various embodiments, the at least one additive is therefore liquid at room temperature and comprises at least one polyol that is liquid at room temperature, at least one color pigment and optionally at least one reaction accelerator.

In various other embodiments, the at least one additive is solid at room temperature and comprises at least one polyolefin that is solid at room temperature and at least one color pigment.

The additive is used in various embodiments to match the color of the adhesive to the workpiece, for example to match the color of an adhesive joint to a wooden board or chipboard and to the edge band used that is adhered to the narrow side of the board.

Furthermore, additives that influence the recrystallization behavior of the adhesive can positively alter the reworking capability in what are known as the reworking zones of the devices used, for example edge-banding machines, in such a way that smearing in said zones is avoided.

Accordingly, in certain methods, the at least one additive is selected such that it comprises at least one agent for influencing the recrystallization of the adhesive which, in step (i), is added in a selected and controlled manner, such that the reworking capability of the workpiece, which is produced from the substrate onto which the adhesive is applied in step (ii), is improved.

Reaction accelerators can accelerate the cross-linking of reactive adhesives, with the result that the further processing can be carried out in an accelerated manner. Said accelerators can therefore also be added in a selected and controlled manner in step (i), such that the cross-linking of the adhesive according to step (ii) is accelerated.

The additives are mixed in with the base component of the adhesive in quantities that are adjusted according to the intended use. Such an adjustment can also take place continuously, for example on the basis of the type and/or color of the substrate. Conventionally, the quantities added are in the range of from 0.01 to 20 wt. % based on the total weight of the compounded adhesive, preferably in the range of from 0.01 to 10 wt. %, even more preferably 0.1 to 5 wt. %. Such quantities allow a simple and controlled feed-in, without detrimentally influencing the properties of the adhesive. The additive in the form of a corresponding formulation can be added to the reactive adhesives described herein, for example in quantities of from 0 to 2 wt. %, preferably 0.1 to 2 wt. %, based on the total weight of the compounded adhesive. The additive in the form of a corresponding formulation can be added to the non-reactive adhesives described herein, for example in quantities of from 0 to 5 wt. %, preferably 0.1 to 5 wt. %, based on the total weight of the compounded adhesive.

In various embodiments of the method, the at least one additive, which comprises at least one color pigment, is added in step (i) in a selected and controlled manner, such that the color of the adhesive compounded in this way is adapted as desired, for example so as to match that of the substrate onto which it is applied in step (ii).

The substrate can for example be a wooden board or a chipboard, the adhesive being used to bond edge bands to, and thus finish, the narrow side in order to obtain a finished workpiece. The edge bands can be composed of plastics materials, e.g. ABS, PP or the like, or paper-based materials.

One embodiment of the invention relates to a method in which a device for compounding and applying an adhesive is provided, the device comprising a supply unit, a compounding unit and an application unit, the supply unit being used to supply a base component of the adhesive and/or the at least one additive, the compounding unit continuously mixing the base component of the adhesive with the supplied additive in order to form the compounded adhesive and continuously conveying the compounded adhesive, the adhesive compounded in this way being conveyed from the compounding unit into the application unit, and it being possible to apply said adhesive from the application unit onto a substrate. As a result, depending on the adhesive required for the relevant substrate to be processed, the adhesive can, starting from a base component, be provided with selectable additives and mixed such that the adhesive produced in this way can be applied to the substrate. Advantageously, this allows the color to be selected together with additives and, additionally or alternatively, the chemical properties and/or the biological properties and/or the physical properties of the adhesive can be influenced. For instance, this allows biocidal properties to be influenced in order to reduce mold formation or improve water resistance. Electrical properties can also be influenced in a targeted manner.

It is advantageous according to the invention for the supply unit to have a dosing unit for the dosed supply of the base component and/or of at least one additive. This allows the base component and the selected additive or the selected additives to be supplied so as to be dosed in the required quantities. Alternatively, it can also be possible to supply only the base component in a dosed manner, and the additives can be supplied manually in a simplified version.

Alternatively, it is also advantageous for the compounding unit to have a dosing unit for the dosed supply of at least one additive.

Alternatively, it is also advantageous for the supply unit to allow a manual supply of the base component and/or at least one additive, or to have such a supply. As a result, in the simplest case, a manual supply can take place by means of the supply unit, such that a corresponding mixing and application can take place thereafter.

It is also advantageous for the supply unit to allow a controlled supply of the base component and/or at least one additive, or to have such a supply. As a result, in an alternative embodiment, an automated, controlled supply can take place by means of the supply unit, such that a corresponding mixing and application can take place thereafter.

Alternatively, it is also advantageous for the compounding unit to allow a controlled supply of the base component and/or at least one additive, or to have such a supply. This allows for a later feed-in to be performed, in addition to the supply from the supply unit.

For this purpose, it is also advantageous for the supply unit and/or the compounding unit to comprise at least one pump which continuously supplies or conveys the base component. For this purpose, a single pump can be provided for the base component, which pump can also be used for conveying the mixed adhesive. Alternatively, a pump can also be provided for conveying the mixed adhesive. It can also be advantageous for at least one additive or a plurality of additives or each additive to be provided with a pump. The pump can be designed as a gear pump or an injector or the like, for example.

In this case, it is alternatively particularly advantageous for the supply unit and/or the compounding unit to comprise a pump which continuously or discretely supplies at least one additive. This allows the additive to be dosed into the desired mixture.

It is also advantageous for the supply unit and/or the compounding unit to have a heater for melting the base component and/or at least one additive. The adhesive can thus be processed as a hot-melt adhesive.

It is also advantageous for the compounding unit to have a mixing device for mixing the base component and/or the at least one additive. This allows the adhesive to be effectively homogenized as a mixture of the base component and the additives used.

It is particularly advantageous for the compounding unit to have a mixing device that has a mixing chamber for mixing the base component and/or the at least one additive.

Alternatively, it is advantageous for the compounding unit to have a static or dynamic mixing means in the mixing chamber. This allows the adhesive to be mixed in an improved manner and within a shorter time.

For this purpose, it is particularly advantageous for the dynamic mixing means to be a driven mixing means, e.g. in particular a rotatable mixing means. This allows particularly effective mixing to be performed.

It is also particularly advantageous for the static mixing means to be a stationary mixing means in the mixing chamber and/or on a wall of the chamber. As a result, a particularly cost-effective solution can be found.

It is also advantageous for the static mixing means to be formed by a hollow cylindrical chamber that has a spiral flow path formed therein. As a result, effective mixing can be achieved over the length of the flow path.

It is also advantageous for the spiral flow path to be formed by a spiral coil inserted into the hollow cylindrical chamber. This allows the mixing means to be formed in a particularly simple manner. If the coil is removable, it can also be cleaned in a simple manner.

It is further advantageous for the static mixing means to be formed by a spiral coil arranged or formed on the wall of the mixing chamber. Said coil can protrude from the wall or be incorporated in the wall in the manner of a groove. This brings about a spiral flow, which brings about mixing.

It is also advantageous for the compounding unit to have a distribution device for the distributed ingress of the base component and/or the distributed ingress of at least one additive into the mixing chamber. As a result, a good precondition for effective mixing is already achieved because the base component and/or the at least one additive is/are already distributed in the mixing chamber before the mixing.

For this purpose, it is also advantageous for the mixing chamber to have an outlet opening for discharging the mixed adhesive into the application unit. This allows the mixed adhesive to be continuously discharged from the compounding unit in order to fill the application unit and ideally achieve a continuous application process.

This is particularly advantageous if the application unit has means for applying the adhesive. This allows targeted application of the adhesive to the substrate to be processed.

It is particularly advantageous for the means for applying the adhesive to have a nozzle and/or an application roller. This allows a targeted and dosed application of the adhesive.

It is advantageous for the application unit to have a reservoir for intermediate storage of a defined quantity of the adhesive. This is achieved by providing a certain adhesive reserve that can be applied, for example, while the compounding unit is being filled or while an additive change takes place.

In a particularly advantageous embodiment, it is expedient for the reservoir to be used as the supply unit and the compounding unit.

In this case, it is expedient in an advantageous embodiment for the mixing to take place in the reservoir on account of the rotation of the application roller. A flow is thus generated in the quantity of adhesive in the reservoir by means of the application roller, which flow contributes to improved mixing.

Further advantageous embodiments are described by the dependent claims and by the following description of the drawings. It goes without saying that embodiments described herein in connection with the methods according to the invention can be applied to like effect to the devices that are used in said methods, and vice versa. For example, the type of mixing that is described above within the context of the device can be applied to the method, and the specific additives described above in connection with the methods can also be used within the context of the device.

The invention is described in more detail in the following on the basis of an embodiment and with reference to the drawings.

BRIEF DESCRIPTION OF THE DRAWINGS

FIG. 1 shows a first embodiment of a device 1 for compounding and applying adhesive, comprising a supply unit 2, a compounding unit 3 and an application unit 4, which device can be used in the methods according to the invention.

Figure 1:
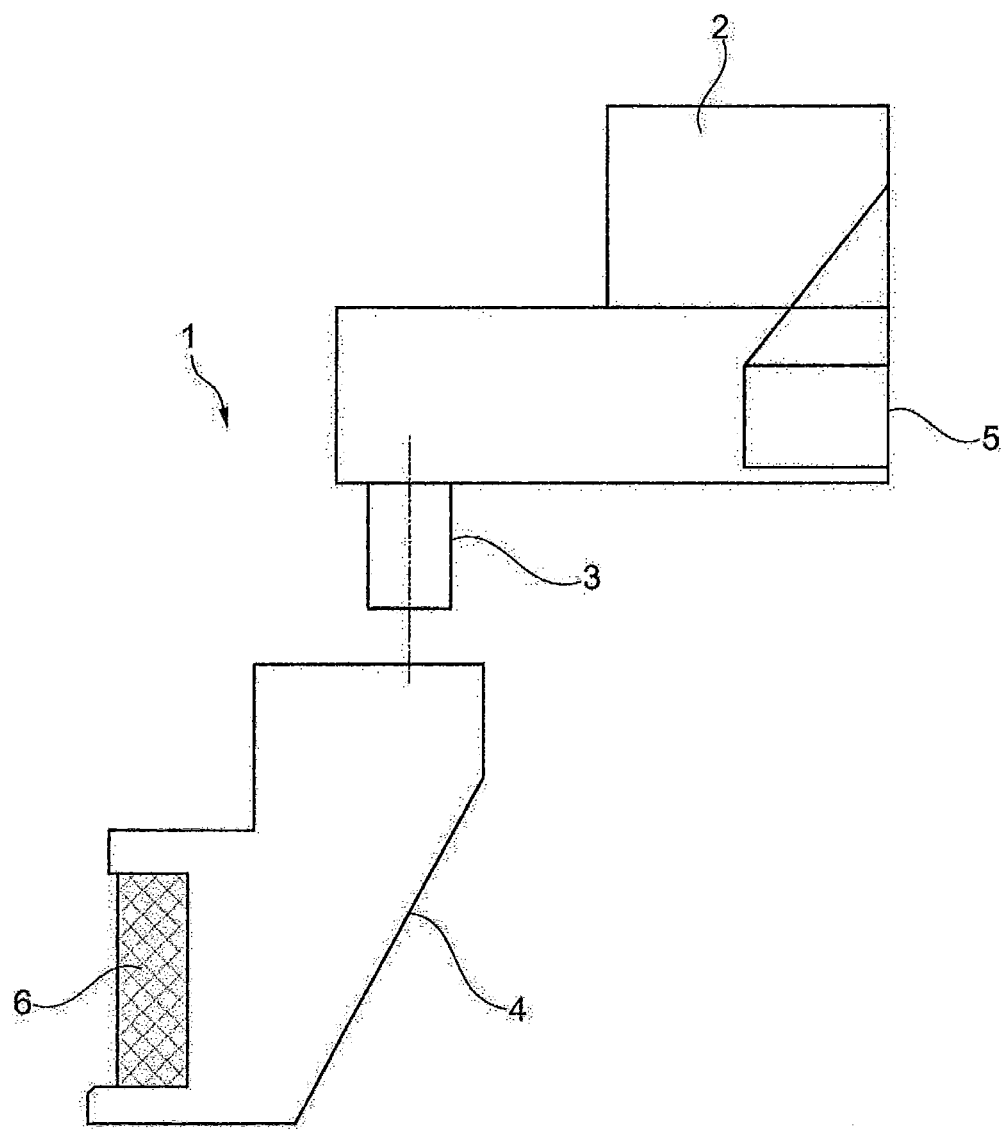
FIG. 1 shows a first embodiment of a device for compounding and applying adhesive, which can be used in the methods according to the invention.

The supply unit 2 is used to supply the base component of the adhesive, it being possible for the base component of the adhesive to already be provided in a liquid or fluid state.

The base component of the adhesive can also be provided as a solid, granulate, powder or the like, and can be poured into the supply unit 2. For this purpose, the supply unit 2 can have a melting unit 5 which is used to melt the base component. The base component is supplied from the supply unit 2 to the compounding unit 3, to which additives can in turn be supplied.

The base component and the additive/s are then mixed in the compounding unit 3. For this purpose, a non-driven rotating mixer, a driven rotating mixer or a static non-rotating mixer can be provided in the compounding unit 3, which mixer mixes the components to be mixed in the compounding unit 3. The mixed components of the adhesive are then guided from the compounding unit 3 into the application unit 4, from which unit the adhesive can be applied onto a substrate. For this purpose, the application unit 4 has a means for carrying out the application to the substrate, for example an application roller 6.

However, the supply unit 2 can also be used to supply the base component of the adhesive and at least one additive, meaning that the supply unit 2 is already supplied with the base component and the at least one additive and forwards said component and additive on to the compounding unit, for example to mix the components.

The supply of the base component to the supply unit and/or the compounding unit preferably take places in a controlled, automated manner. In a further embodiment of the invention, one component or the other can also be supplied manually.

The compounding unit 3 continuously mixes the base component of the adhesive with the supplied additive/s in order to form the compounded adhesive, and also continuously conveys the compounded adhesive. For this purpose, the compounding unit preferably has a pump which conveys the base component or the mixed adhesive. If only the base component is conveyed by the pump, the mixed adhesive is also conveyed because the base component constitutes the main portion of the mixed adhesive.

Figure 2:
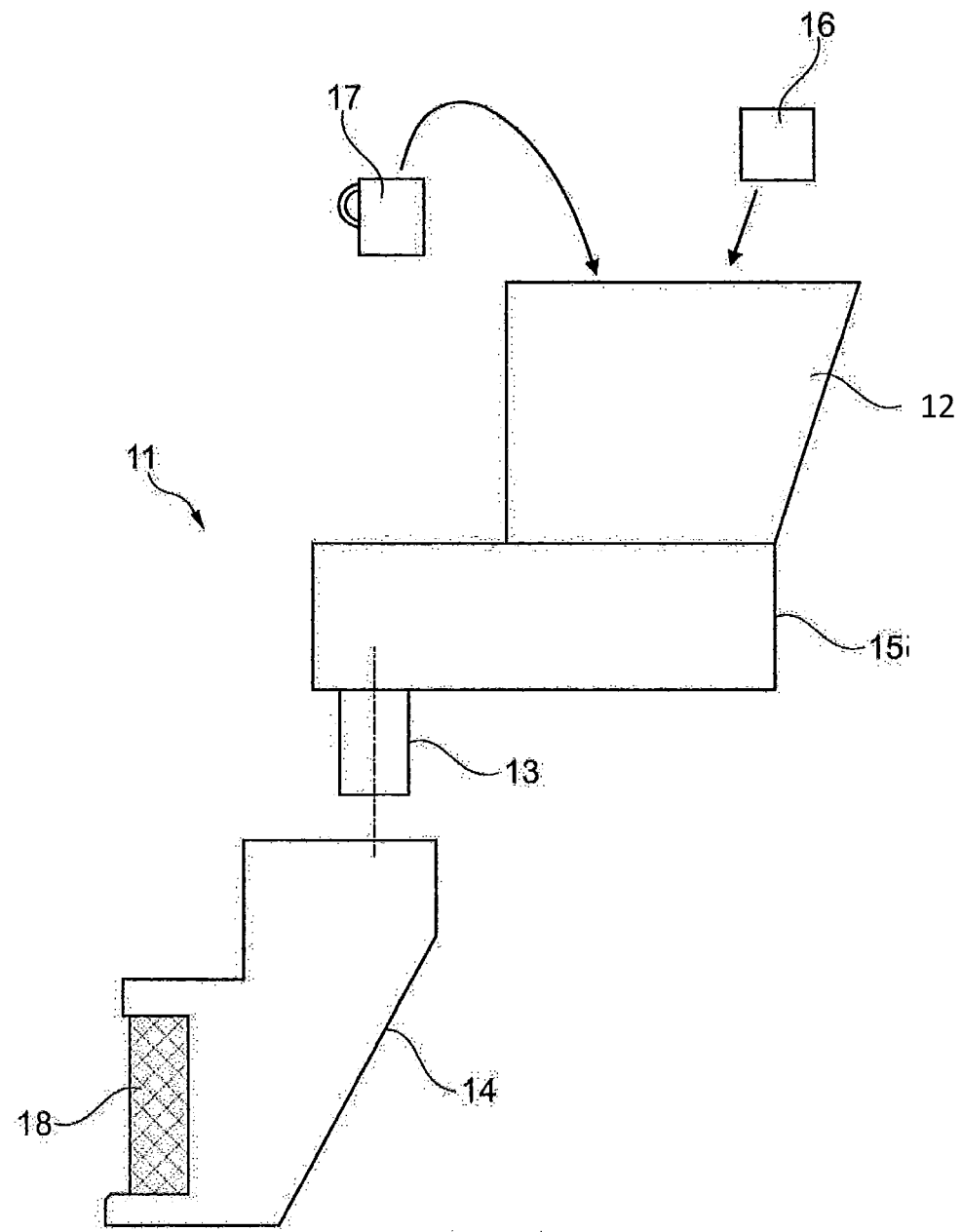
FIG. 2 shows a further embodiment of a device for compounding and applying adhesive, which can be used in the methods according to the invention.

FIG. 2 shows a further embodiment of a device 11 according to the invention for compounding and applying adhesive, comprising a supply unit 12, a compounding unit 13 and an application unit 14. The supply unit 12 is again used to supply the base component 16 of the adhesive, it being possible for the base component 16 of the adhesive to already be provided in a liquid or fluid state, as stated above. The base component 16 of the adhesive can also be provided as a solid, granulate, powder or the like and can be poured into the supply unit 12. For this purpose, the supply unit 12 can optionally have a melting unit 15 which is used to melt the base component 16. The base component 16 is supplied from the supply unit 12 to the compounding unit 13, to which additives 17 can optionally also be supplied. Alternatively, the additives 17 can also be supplied to the supply unit 12, as shown in FIG. 2.

The base component 16 and the additive/s 17 are then mixed in the compounding unit 13. For this purpose, a non-driven rotating mixer, a driven rotating mixer or a static non-rotating mixer can in turn be provided in the compounding unit 13, which mixer mixes the components 16, 17 to be mixed in the compounding unit 13. The mixed components 16, 17 of the adhesive are then guided from the compounding unit 13 into the application unit 14, by means of which the adhesive can be applied onto a substrate. For this purpose, the application unit 14 in turn has a means for applying the adhesive onto the substrate, for example an application roller 18.

As shown in FIG. 2, in addition to the supply of the base component 16 of the adhesive, at least one additive is also supplied by means of the supply unit 12, meaning that the supply unit 12 is already supplied with the base component 16 and also the at least one additive 17 and forwards said component and additive onto the compounding unit 13, for example to mix the components.

The supply of the base component 16 to the supply unit 12 and/or the compounding unit 13 preferably take places in a controlled, automated manner. Alternatively, the base component 16 can also be supplied manually. The additives 17 are advantageously supplied manually. Alternatively, said additives 17 can also be supplied in an automated manner.

The compounding unit 13 in turn continuously mixes the base component 16 of the adhesive with the supplied additive/s 17 in order to form the compounded adhesive, and also continuously conveys the compounded adhesive.

For this purpose, the compounding unit optionally and preferably has a pump (not shown) which conveys the base component or the mixed adhesive. If only the base component is conveyed by the pump, the mixed adhesive is also conveyed because the base component constitutes the main portion of the mixed adhesive.

Figure 3:
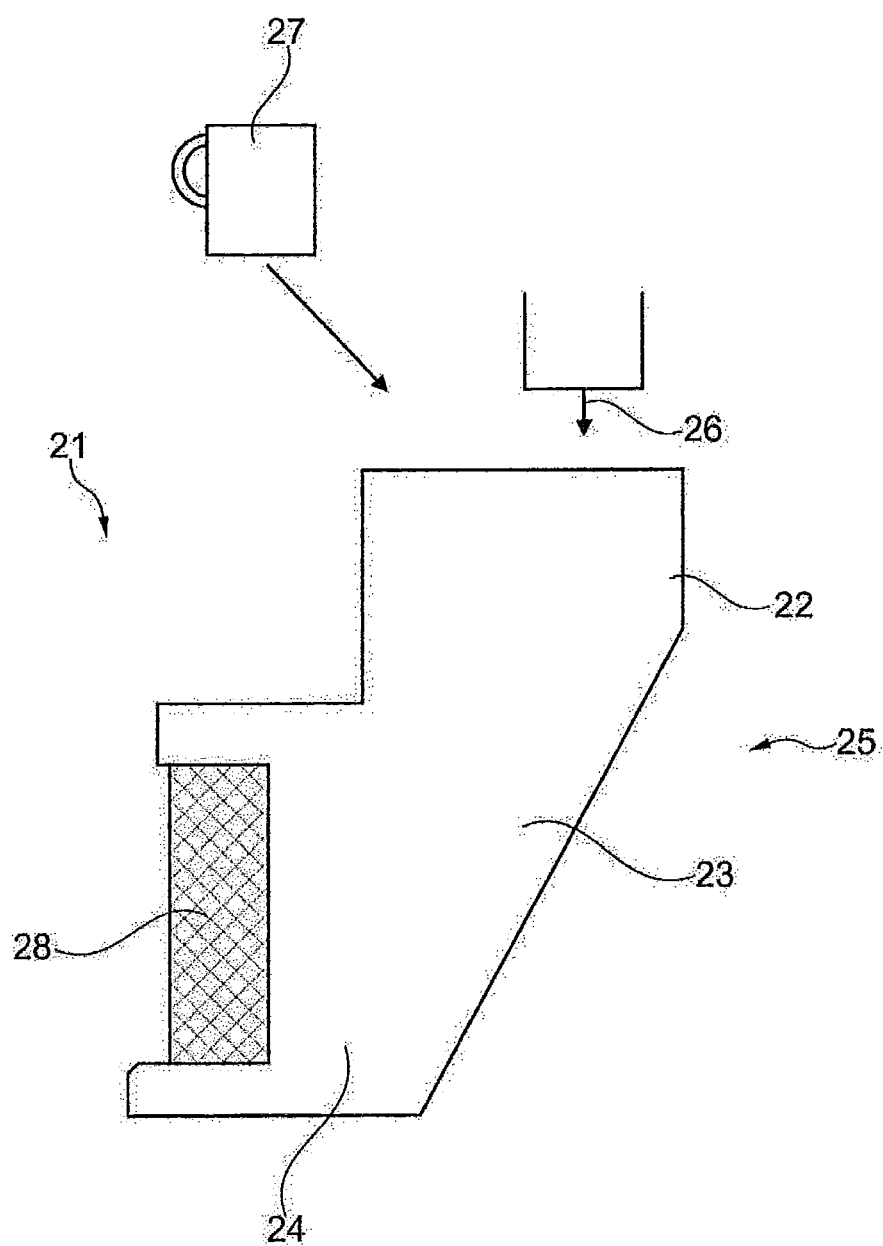
FIG. 3 shows a further embodiment of a device for compounding and applying adhesive, which can be used in the methods according to the invention.

FIG. 3 shows a further embodiment of the device 21 according to the invention for compounding and applying adhesive. The device contains a supply unit 22, a compounding unit 23 and an application unit 24, which are all integrated in a housing 25 or in a vessel.

The supply unit 22 is again used to supply the base component 26 of the adhesive, it being possible for the base component 26 of the adhesive to already be provided in a liquid or fluid state, as stated above. The base component 26 of the adhesive can also be alternatively provided as a solid, granulate, powder or the like and can be poured into the supply unit 22. For this purpose, the supply unit 22 can optionally have a melting unit (not shown in FIG. 3, however) which is used to melt the base component 26. The base component 26 and the at least one additive 27 are supplied from the supply unit 22 to the compounding unit 23. The base component 26 and the additive/s 27 are then mixed in the compounding unit 23.

For this purpose, a non-driven rotating mixer, a driven rotating mixer or a static non-rotating mixer can in turn be provided in the compounding unit 23, which mixer mixes the components 26, 27 to be mixed in the compounding unit 23.

The application roller 28 can also be used, albeit indirectly, as the mixer, which roller, on account of the rotation thereof in the compounding unit, brings about a flow that mixes the base component and the at least one additive.

The mixed components 26, 27 of the adhesive are then discharged from the application unit 24 and applied to a substrate by means of the application roller 28.

As shown in FIG. 3, in addition to the supply of the base component 26 of the adhesive, at least one additive is also supplied by means of the supply unit 22. The base component 26 is preferably supplied to the supply unit 22 manually, but this can alternatively also be performed in a controlled manner. The additives 27 are advantageously supplied manually. Alternatively, said additives 27 can also be supplied in an automated manner.

Figure 4:
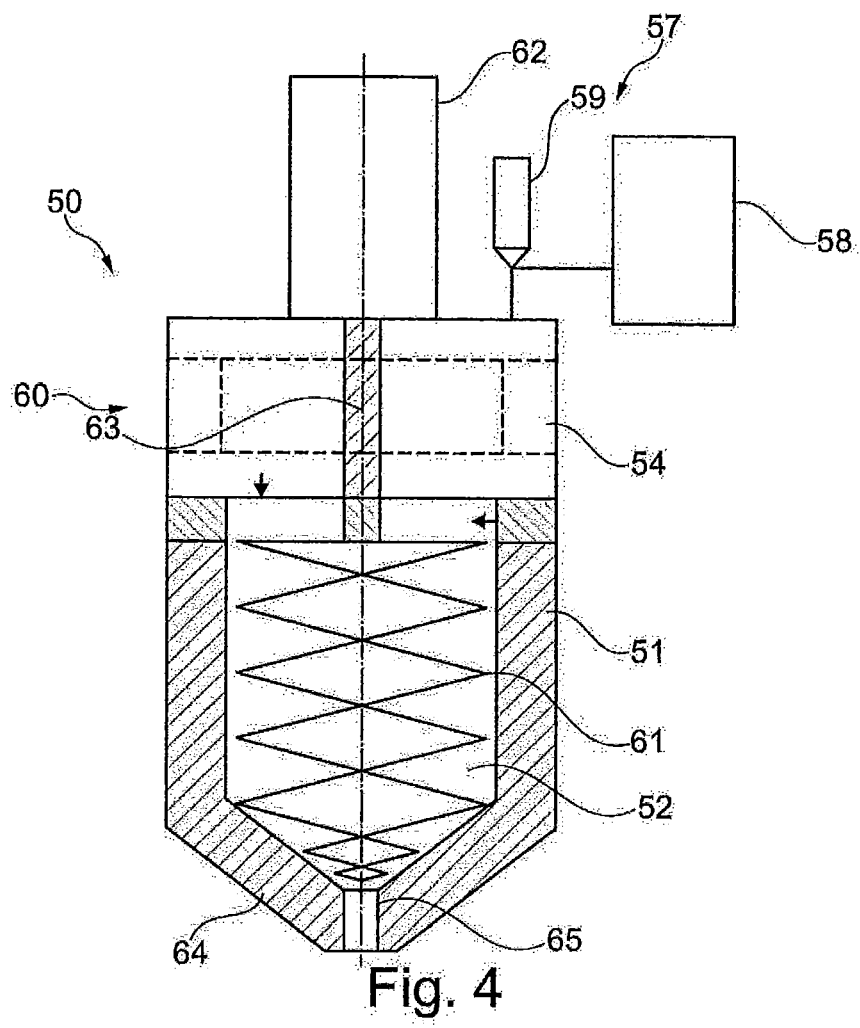
FIG. 4 is a sectional view of one embodiment of a compounding device.
Figure 5:
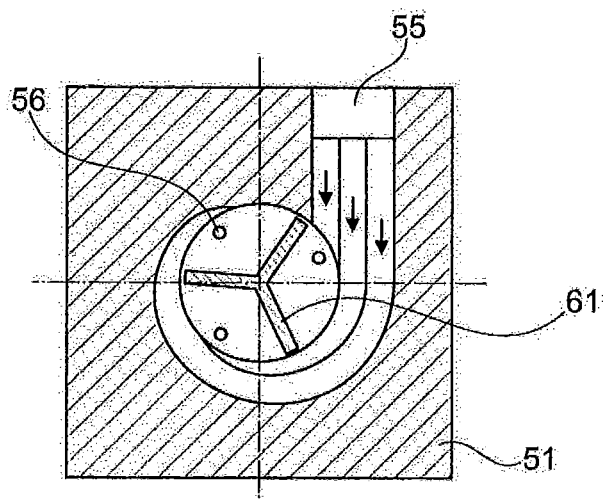
FIG. 5 is a sectional view of the compounding device according to FIG. 4.
Figure 6:
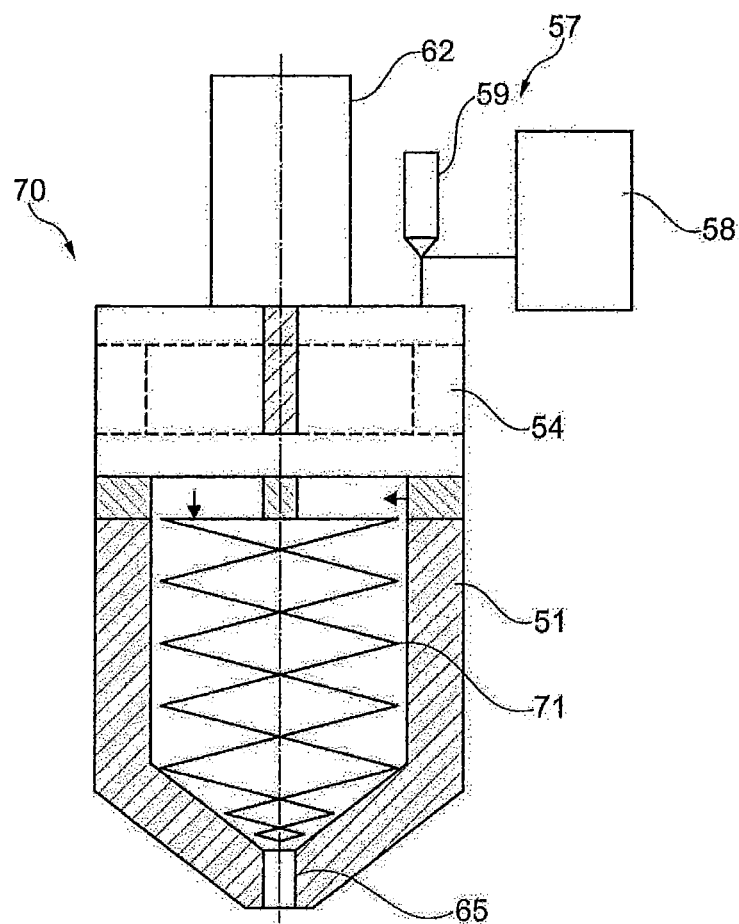
FIG. 6 is a sectional view of a further embodiment of a compounding device.

FIGS. 4 to 6 show embodiments of compounding units that are designed so as to have different mixers.

FIG. 4 shows a compounding unit 50 that has a housing 51 in which a volume 52 is designed as a mixing chamber. A pump 54 is provided in the upper region 53 of the housing 51 and conveys the base component and/or the additive/s into the mixing chamber 52 of the housing 51. For this purpose, the base component enters the mixing chamber 52 by means of a supply 55 having inlets 56 into the mixing chamber; see FIG. 5. The supply 55 distributes the base component in the mixing chamber 52 by means of the spiral channel guide. Three channels are formed for this purpose in the embodiment, which channels allow the base component to enter the mixing chamber at an angle of approximately 120°, each of the inlets 56 being arranged so as to be offset by 120°. The pump 54 can preferably be a gear pump.

The pump 54 is used as a dosing unit for the dosed supply of the base component into the mixing space 52.

A dosing unit 57 is further provided, which brings about the feed-in of at least one additive component. For this purpose, the dosing unit 57 can have a reservoir 58 and a valve 59, such that the feed-in can be performed by actuation of the valve 59. The pump 54 can be used for this purpose, in order to convey the additive into the mixing chamber 52. Alternatively, the dosing unit 57 can have its own pump or it can have an injector, by means of which the at least one additive can be dosed into the mixing chamber 52.

The housing 51 can advantageously be heated, meaning that a melted base component and/or a melted additive can be further processed in a melted state.

The compounding unit 50 has a mixing device 60 for mixing the base component and/or the at least one additive.

For this purpose, a rotatable mixing element 61 is arranged in the mixing chamber 52, which element can be driven by a drive motor 62, by means of the shaft 63, in order to mix the base component and/or the at least one additive. Accordingly, the mixing element 61 is a dynamic mixing means which can be rotated in a controlled manner. In this case, the drive motor 62 is preferably an electric motor or a motor driven by other means. In addition to driving the mixing element 61, the motor 62 can also be used to drive the pump 54. A drive would thus be omitted, because one drive could be used simultaneously for two purposes. Alternatively or additionally, the drive motor 62 can also be provided in order to drive the pump for conveying the additives.

The mixing chamber 52 preferably has an opening 65 in the bottom face 64 thereof, by means of which the mixed adhesive can be discharged from the compounding unit 50.

Figure 7:
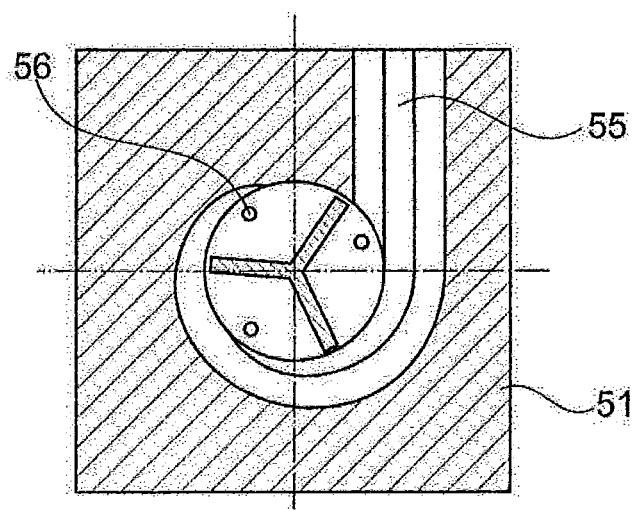
FIG. 7 is a sectional view of the compounding device according to FIG. 6.

FIGS. 6 and 7 show a further embodiment of a compounding unit 70 according to the invention which is designed so as to be substantially similar to the compounding unit 50 in FIGS. 4 and 5.

In contrast to the example in FIGS. 4 and 5, the device 70 is provided with a non-driven mixing element 71 which, although rotatably mounted in the mixing chamber 52, is not designed to be driven by the drive 62. The shaft 63 does not drive the mixing element 71. However, on account of the flow of the adhesive in the mixing chamber, the mixing element 71 can rotate and thus mixes the adhesive that is composed of the base component and/or at least one additive.

Figure 8:
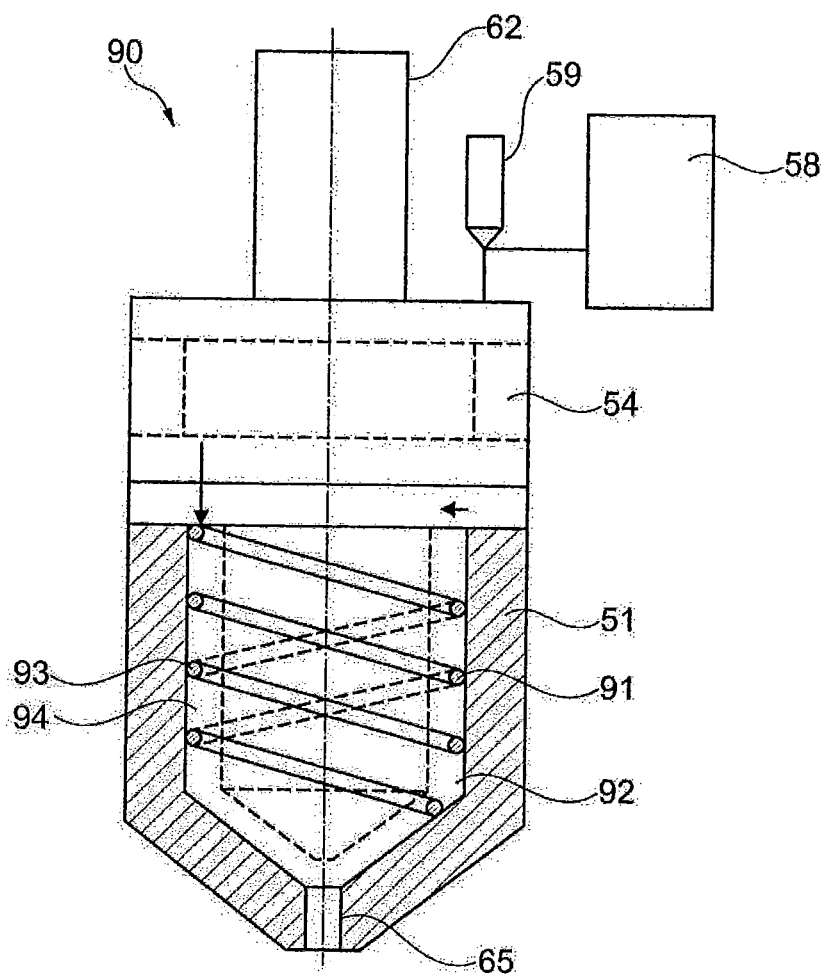
FIG. 8 is a sectional view of a further embodiment of a compounding device.
Figure 9:
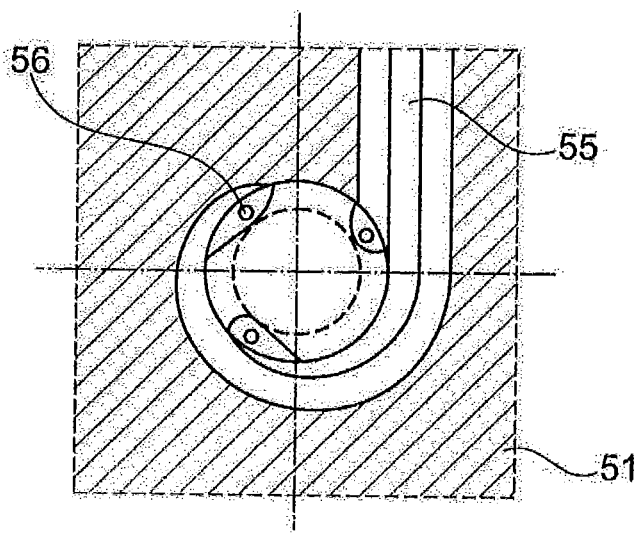
FIG. 9 is a sectional view of the compounding device according to FIG. 8.

FIGS. 8 and 9 show a further embodiment of a compounding unit 90 that is designed so as to be substantially similar to the compounding unit 50 in FIGS. 4 and 5 and can likewise be used in the methods according to the invention.

In contrast to the example in FIGS. 4 and 5, the device 90 is provided with a static mixer 91. The static mixer 91 is composed of a hollow cylinder 92 into which a coil 93 is placed in order to form a spiral flow path 94. The fluid base component and the additives flow along the flow passage and mix therein.

The mixer 91 is therefore a static mixing means which is formed as a stationary mixing means in the mixing chamber or on a wall of the mixing chamber. For this purpose, the mixing chamber is altered so as to create a spiral flow passage that is formed by a hollow cylindrical chamber having a spiral flow passage formed therein.

LIST OF REFERENCE SIGNS 1 device
2 supply unit
3 compounding unit
4 application unit
5 melting unit
6 application roller
11 device
12 supply unit
13 compounding unit
14 application unit
15 melting unit
16 base component
17 additive
18 application roller
21 device
22 supply unit
23 compounding unit
24 application unit
25 housing 26 base component
27 additive
28 application roller
50 compounding unit
51 housing
52 volume, mixing chamber
53 upper region
54 pump
55 supply
56 entry
57 dosing unit
58 reservoir
59 valve
60 mixing device
61 mixing element
62 drive motor
63 shaft
64 bottom face
65 opening
70 compounding unit
71 mixing element
90 compounding unit
91 mixer
92 hollow cylinder
93 coil
94 flow path

EXAMPLES

Example 1

Technomelt PUR 270/7 (Henkel AG & Co. KGaA, DE) was used as the adhesive base component, into which yellow, magenta and blue color pastes were stirred, each in an amount of 0.1, 0.5 or 1.0 wt. % based on the total weight of the adhesive. For this purpose, the adhesive base component was melted for 45 minutes in a convection oven at 140° C. 200 g thereof was transferred into a reactor (160° C.) and the color paste was added in and stirred for 10 minutes in a vacuum.

On the basis of the adhesives compounded in this way, a visual inspection was carried out, the viscosity was determined (Brookfield, spindle 28, 150° C., 5 rpm) and a rheometer oscillatory test was carried out, from which the temperature of the crossover of the storage and loss modulus (tan δ=1) and the temperature at which the storage modulus G' reaches the value of $10^6$ Pa are analyzed. The results are shown in Table 1.

TABLE 1

| Viscosity (Pas) | 0% color paste | 0.1% color paste | 0.5% color paste | 1.0% color paste |
|---|---|---|---|---|
| Yellow paste | 34 | 40 | 44 | 47 |
| Magenta paste | 34 | 40 | 43 | 46 |
| Blue paste | 34 | 40 | 42 | 46 |
| T [° C.] when tan (δ) = 1.00 | | | | |
| Yellow paste | 49.3 | 50.4 | 52.4 | 53.3 |
| Magenta paste | 49.3 | 53.4 | 55.4 | 56.4 |
| Blue paste | 49.3 | 54.4 | 55.4 | 56.4 |
| T [° C.] when G' = 1,000,000 Pa | | | | |
| Yellow paste | 46.0 | 46.3 | 47.3 | 47.3 |
| Magenta paste | 46.0 | 48.4 | 49.0 | 49.4 |
| Blue paste | 46.3 | 49.4 | 49.4 | 50.4 |

Example 2

Technomelt PUR 270/7 (Henkel AG & Co. KGaA, DE) was again used as the adhesive base component, into which black color pastes were stirred in amounts of 1, 2, 3 or 5 wt. % based on the total weight of the adhesive. For this purpose, the adhesive base component was melted for 45 minutes in a convection oven at 140° C. 200 g thereof was transferred into a reactor (160° C.) and the color paste was added in and stirred for 10 minutes in a vacuum.

On the basis of the adhesives compounded in this way, the viscosity (Brookfield, spindle 28, 150° C., 5 rpm), the initial strength, the strength build-up and the viscosity stability and color stability at the application temperature were determined, and a rheometer oscillatory test was carried out, from which the temperature of the crossover of the storage and loss modulus (tan δ=1) and the temperature at which the storage modulus G' reaches the value of $10^6$ Pa are analyzed. The results are shown in Table 2.

TABLE 2

| | 270-7 | 270-7 + 1% black paste | 270-7 + 2% black paste | 270-7 + 3% black paste | 270-7 + 5% black paste |
|---|---|---|---|---|---|
| After 2 h | | | | | |
| EMod [N/mm²] | 42 | 40 | 43 | 48 | 41 |
| σ – max [N/mm²] | 2.2 | 1.9 | 2.2 | 2.7 | 3.1 |
| ε-fracture [%] | — | 43 | 134 | 127 | 538 |
| After 2 days | | | | | |
| EMod [N/mm²] | 85 | 89 | 85 | 83 | 56 |
| σ – max [N/mm²] | 7.9 | 18.4 | 16.9 | 15.9 | 13.0 |
| ε-fracture [%] | 842 | 752 | 822 | 768 | 907 |
| After 7 days | | | | | |
| EMod [N/mm²] | 116 | 99 | 79 | 94 | 63 |
| σ – max [N/mm²] | 21.5 | 14.2 | 14.7 | 19.1 | 13.4 |
| ε-fracture [%] | 922 | 599 | 675 | 759 | 851 |
| Viscosity (Pas) | | | | | |
| After mixing | 29 | 45 | 54 | 58 | 153 |
| After 1 h | 36 | 46.2 | 57.2 | 64.4 | 183 |
| After 2 h | 41.3 | 50.1 | 68.7 | 77.8 | 212 |
| After 3 h | 45.3 | 54.6 | 78.4 | 88.8 | 251 |

TABLE 3

|  | 0% color paste | 0.1% color paste | 0.5% color paste | 1.0% color paste | 5.0% color paste |
| --- | --- | --- | --- | --- | --- |
| Viscosity (Pas) | 29 | 45 | 54 | 58 | 153 |
| T [° C.] when tan (δ) = 1.00 | 49.4 | 50.4 | 57.5 | 55.4 | 63.5 |
| T [° C.] when G' = 1,000,000 Pa | 45.6 | 46.3 | 45.3 | 45.3 | 46.3 |

Example 3

An adhesive base component (Technomelt PUR 270/7 Henkel AG & Co. KGaA, DE) together with a color paste as described in examples 1 and 2 was applied to the straight edge of a chipboard (IKEA, 19.00 mm thick) by means of a HOMAG POWERLINE KRF 620 edge-banding machine having an application roller (Nordson MC Series) and a melting device (Nordson MC Series); an ABS edge band (Giplast Sincro, Sitech) having a thickness of 0.9 mm was then adhered to said chipboard. The conditions were as follows:

Conditions A:
temperatures: premelter: 130° C., tube: 130° C., head: 140° C.; roller: 144° C.
Nordson premelter pump: 80 rpm
pump of the mixing head for the additive: 3 rpm (rotations per minute)
80-100 boards can be produced in approximately 3 hours without difficulty
no threading, no smearing, no adhesive joint
very high initial adhesion Conditions B:
temperatures: premelter: 130° C., tube: 140° C., head: 140° C.
Nordson premelter pump: 80 rpm
pump of the mixing head for the additive: 2.8 rpm
4 sample cartridges were filled Conditions C:
temperatures: premelter: 130° C., tube: 140° C., head: 140° C.
Nordson premelter pump: 80 rpm
pump of the mixing head for the additive: 2.4 rpm
4 sample cartridges were filled Further reducing the power of the pump of the mixing head for the additive resulted in uncolored adhesive. It was observed that the colored adhesives could be processed just as effectively as the adhesive without an additive.

The invention claimed is:

1. A continuous method for compounding and applying a one component hot melt adhesive composition, comprising:
providing a solid hot melt adhesive base component, wherein the base component is a reactive hot-melt adhesive composition that is a solid at room temperature or a non-reactive thermoplastic hot melt adhesive composition that is a solid at room temperature;
heating the solid base component to a temperature above a melting point of the base component;
providing at least one additive;
continuously mixing the base component with the at least one additive in a compounding unit to produce the compounded, one component hot melt adhesive;
continuously conveying the compounded adhesive from the compounding unit to an application unit having an application roller; and
continuously applying the compounded, one component hot melt adhesive from the application unit to a substrate.

2. The method according to claim 1, wherein the base component of the adhesive and/or the at least one additive in step (i) are supplied to a mixer in a controlled manner.

3. The method according to claim 1, wherein the adhesive is applied at a temperature above the melting point of the base component of the adhesive.

4. The method according to claim 1, wherein the at least one additive comprises a material which influences the chemical properties, the biological properties and/or the physical properties of the adhesive.

5. The method according to claim 1, wherein the at least one additive comprises a color pigment, an agent for improving moisture resistance, an agent for improving resistance against mold and/or fungus formation, a biocidal agent, an additive for improved energy absorption, a primer for improved adhesive bonding, an agent for influencing the recrystallization of hot-melt adhesives and/or a reaction accelerator.

6. The method according to claim 1, wherein the at least one additive:
(i) is liquid at room temperature and comprises at least one polyol that is liquid at room temperature, at least one color pigment and optionally at least one reaction accelerator; or
(ii) is solid at room temperature and comprises at least one polyolefin that is solid at room temperature and at least one color pigment.

7. The method according to claim 1, wherein the at least one additive comprises at least one color pigment and is added in step (i) in a predetermined ratio to the base component of the adhesive to provide the compounded adhesive with a predetermined color that matches that of the substrate onto which it is applied in step (ii).

8. The method according to claim 1, wherein the at least one additive comprises at an agent for influencing recrystallization of the compounded adhesive and, in step (i), is added in a predetermined manner to provide the compounded adhesive with a reworking capability.

9. The method according to claim 1, further comprising:
supplying the base component of the adhesive and/or the at least one additive from a supply unit to the compounding unit.

10. The method according to claim 9, wherein:
(i) the supply unit has a dosing unit for the dosed supply of the base component and/or the at least one additive, or the compounding unit has a dosing unit for the dosed supply of the at least one additive; and/or
(ii) the supply unit allows a manual supply of the base component and/or the at least one additive; and/or
(iii) the supply unit allows a controlled supply of the base component and/or the at least one additive; and/or
(iv) the compounding unit allows a controlled supply of the base component and/or the at least one additive; and/or
(v) the supply unit and/or the compounding unit comprises at least one pump which continuously supplies the base component; and/or
(vi) the supply unit and/or the compounding unit comprises a pump which continuously or discretely supplies the at least one additive; and/or (vii) the supply unit and/or the compounding unit has a heater for melting the base component and/or the at least one additive; and/or (viii) the compounding unit has a mixing device comprising a mixing chamber that has a static mixer or a dynamic mixer for mixing the base component and/or the at least one additive; and/or (ix) the compounding unit has a distribution device for the distributed ingress of the base component and/or the at least one additive into the mixing chamber; and/or (x) the application unit has a reservoir for intermediate storage of a defined quantity of the compounded adhesive, the reservoir being used as the supply unit and compounding unit and the mixing taking place in the reservoir by rotation of the application roller.

11. The method according to claim 9, further comprising supplying the base component to the compounding unit through a supply comprising a spiral channel guide.

12. The method according to claim 1 wherein the base component of the adhesive is a non-reactive, thermoplastic hot melt adhesive.

13. The method according to claim 1 wherein the base component of the adhesive is a moisture curing reactive polyurethane hot-melt adhesive composition.

14. A continuous method for compounding and applying an adhesive composition, comprising:
continuously providing a supply of an adhesive base component through inlets to a mixer, wherein the base component is a moisture reactive, one component hot-melt adhesive composition that is a solid at room temperature;
continuously providing a supply of an additive comprising at least one color pigment, through the inlets to the mixer;
continuously mixing the supply of adhesive base component with the supply of additive in the mixer to produce continuous stream of a compounded adhesive; and
applying the continuous stream of compounded adhesive to a substrate.

15. The method according to claim 14, further comprising applying the compounded adhesive to the substrate using an application roller.

16. The method according to claim 14, wherein the adhesive base component is supplied to the mixer through three spaced inlets.

17. The method according to claim 14, wherein the base component is supplied to the mixing chamber through three inlets, with each inlet offset by about 120°.

18. A continuous method for compounding and applying an adhesive composition, comprising:
continuously providing a supply of an adhesive base component through inlets to a mixer, wherein the inlets provide a spiral channel guide and the base component is a reactive hot-melt adhesive composition or a non-reactive thermoplastic hot melt adhesive composition;
continuously providing a supply of an additive comprising at least one color pigment, through the inlets to the mixer;
continuously mixing the supply of adhesive base component with the supply of additive in the mixer to produce continuous stream of a compounded adhesive; and
applying the continuous stream of compounded adhesive to a substrate.

* * * * *